United States Patent [19]
Malecki et al.

[11] Patent Number: 5,875,871
[45] Date of Patent: Mar. 2, 1999

[54] DEVICE FOR DISTRIBUTION OF LUBRICANT AND A PUMP APPARATUS INCLUDING THE DISTRIBUTION DEVICE

[75] Inventors: Krzysztof Malecki; Waldemar Szymanski, both of Tullinge, Sweden

[73] Assignee: Alfa Laval Agri AB, Tumba, Sweden

[21] Appl. No.: 860,506

[22] PCT Filed: Dec. 22, 1995

[86] PCT No.: PCT/SE95/01571

§ 371 Date: Jul. 28, 1997

§ 102(e) Date: Jul. 28, 1997

[87] PCT Pub. No.: WO96/20366

PCT Pub. Date: Jul. 4, 1996

[30] Foreign Application Priority Data

Dec. 28, 1994 [SE] Sweden ................................. 9404543

[51] Int. Cl.$^6$ .............................. F16N 7/10; F16N 25/00; F01M 9/08
[52] U.S. Cl. ....................... 184/27.3; 184/6.23; 184/6.24; 184/27.1; 184/31; 184/58; 184/65; 184/81; 184/83; 137/561 A; 137/587
[58] Field of Search ................................. 184/6.23, 6.24, 184/26, 27.1, 27.3, 31, 58, 59, 65, 81, 83, 85, 88.1, 96, 105.1; 137/561 A, 587

[56] References Cited

U.S. PATENT DOCUMENTS

| | | | |
|---|---|---|---|
| 74,244 | 2/1868 | Porter | 137/587 |
| 230,760 | 8/1880 | Earle | 137/587 |
| 899,352 | 9/1908 | Stewart . | |
| 1,092,164 | 4/1914 | Organ . | |
| 1,855,516 | 4/1932 | Gits . | |
| 2,141,863 | 12/1938 | Hammond . | |
| 2,666,444 | 1/1954 | Graybeal | 137/561 A |
| 2,965,198 | 12/1960 | Williams et al. | 184/81 |
| 3,217,835 | 11/1965 | Settles . | |
| 3,507,359 | 4/1970 | Warnock . | |
| 3,670,850 | 6/1972 | Swearingen | 184/6.23 |
| 4,512,368 | 4/1985 | Kaminaka et al. | 137/561 A |
| 4,593,716 | 6/1986 | Cesna | 137/561 A |
| 5,209,259 | 5/1993 | Dear et al. | 137/561 A |
| 5,241,867 | 9/1993 | Cohen et al. | 137/561 A |

FOREIGN PATENT DOCUMENTS

| | | | |
|---|---|---|---|
| 141573 | 5/1985 | European Pat. Off. . | |
| 136571 | 7/1952 | Sweden | 137/587 |

*Primary Examiner*—Christopher Verdier
*Attorney, Agent, or Firm*—Hovey,Williams,Timmons & Collins

[57] ABSTRACT

A pump apparatus for a milking machine is provided with a distribution device for the supply of lubricant to the bearings of the pump. The distribution device comprises an inlet for the supply of lubricant from a container, a distributor and at least two outlets for the delivery of lubricant to the different bearings of the pump. The distributor is provided to guide the lubricant, independently of the incoming amount thereof such that the lubricant is equally distributed to each outlets and hence to each bearing.

19 Claims, 5 Drawing Sheets

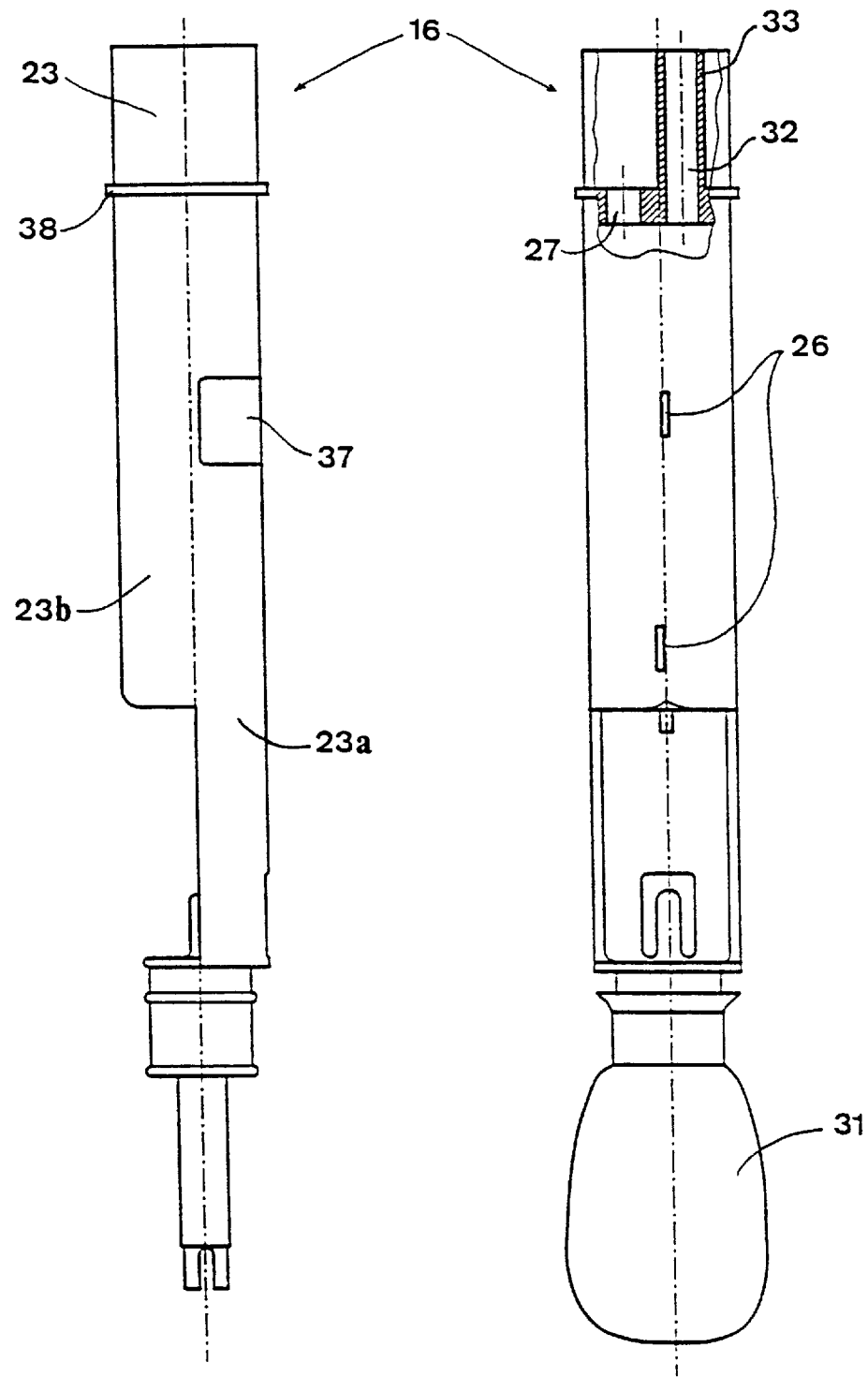

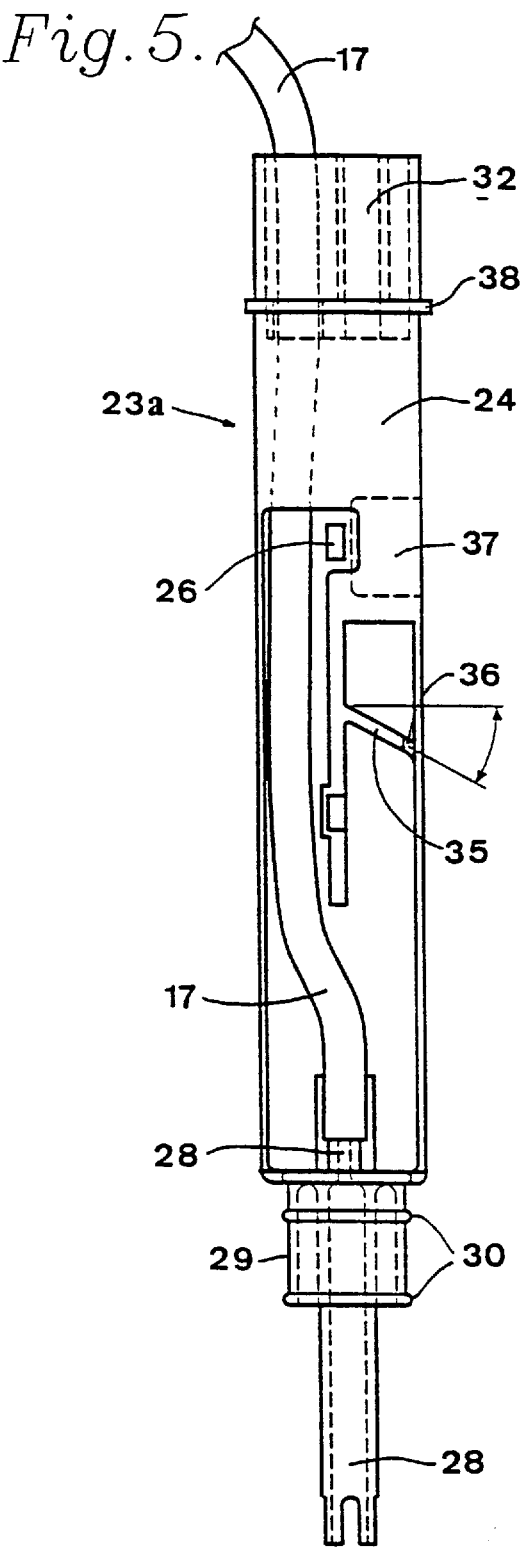
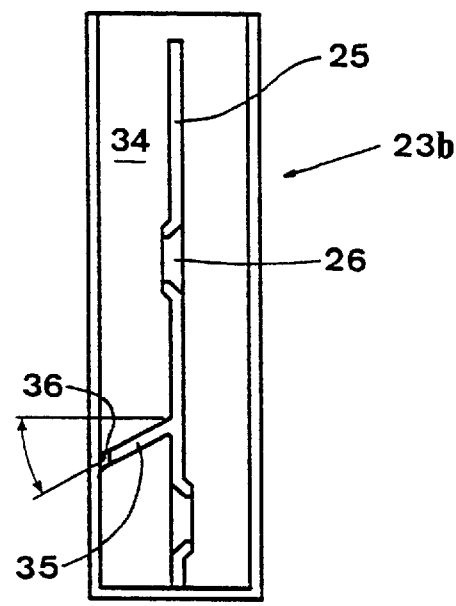

DEVICE FOR DISTRIBUTION OF LUBRICANT AND A PUMP APPARATUS INCLUDING THE DISTRIBUTION DEVICE

BACKGROUND OF THE INVENTION

1. Field of the Invention

The present invention refers to a distribution device for distributing lubricant to different points of lubrication of a pump device, for instance, said distribution device comprising a casing forming an inner room, an inlet means for the delivery of lubricant to the inner room of the casing and at least two outlet means for the removal of lubricant from the inner room of the casing, said outlet means being connectable to said points of lubrication. Furthermore, the invention refers to a pump apparatus, preferably for producing a subpressure in a milking machine, comprising a pump, having a suction side and a pressure side, and a lubrication device for the supply of lubricant to different points of lubrication of the pump apparatus.

2. Description of the Prior Art

Today, milking machines operated by vacuum pumps are used in barns. In order to be able to guarantee a high and uniform milk production as well as the health of the animals, very high requirements are made on the reliability of these pumps. In order to obtain such a reliability, the lubrication of the pump and especially its bearings is very important.

A usual type of pump device being used today is shown in FIG. 1. The pump device comprises a vacuum pump 1 having a suction side 2 and a pressure side 3 terminating in an outlet tube 4. For the delivery of oil to the bearings of the vacuum pump a so called lubricator 5 is used, which comprises an oil container 6 and in its lower part an oil distributor, not shown. With the aid of the oil distributor, it is possible to guide the oil flow to the bearings via oil conduits 7. On the pressure side 3 of the vacuum pump is provided a silencer 8 and an oil trap 9. Both of them separate oil, which is carried by the air on the pressure side, to a respective container 6a and 6b. The use of this known pump device leads to the following problems. The container 6 provided on the lubricator 5 has to be filled with new oil before it is empty, in order to avoid that the bearings jam. Therefore, continuous supervision of the oil level in the container is necessary. The oil containers 6a and 6b, which are connected to the oil trap 9 and the silencer 8 and which collect the oil separated, also have to be continuously supervised in order to avoid that oil flows out on the floor. The oil flow through the lubricator 5 is controlled by means of a valve directly influencing the oil flow by throttling or opening a passage through which the oil is flowing. The oil amount delivered is very difficult to regulate exactly by means of such a valve. Consequently, this adjustment is done with low accuracy today. Furthermore, the outlets are sensitive to particles of dirt or thickened accumulations of oil, which easily may stop up the outlets. Since the oil flow from the known lubricator 5 may not be observed, it is very difficult to determine how much oil that has been delivered. The oil consumption increases drastically if for example any one of the shaft bearings of the vacuum pump is leaking. Since this increase may not be observed, such a leakage may lead to the breakdown of the bearings. Furthermore, the function of the lubricator 5 is very sensitive to a small inclination of the lubricator, since this results in an unequal distribution of oil to the different oil conduits 7, and thus to the different bearings of the pump. Furthermore, the lubricator 5 demonstrates an open construction, which gives rise to a risk for accumulation of dirt in the oil. Consequently, the bearings may be supplied with impurities. Moreover, the handling of this known lubricating system is relatively complicated, since the new container 6 with new oil has to be provided on the lubricator 5, when the oil in the old container runs out. Moreover, the containers 6a and 6b have to be replaced regularly, since separated oil is collected therein. U.S. Pat. No. 1,092,164 shows an air-tight lubricator for lubrication of an engine, comprising a container for oil and an outlet channel from the container. The known lubricator is provided with a control valve for controlling the amount of air to be supplied to the container. Opening of the control valve results in an increase of the amount of air supplied from the environment as well as of the amount of oil which is delivered from the container to the pump. In the upper portion of the container, there is an opening for filling the container when it is empty. In the lower portion of the outlet channel there is a small window for observation of the flow of oil.

U.S. Pat. No. 899,352 shows a similar air-tight lubricator comprising a container with an outlet tube for oil contained in the container and with a control valve for controlling the amount of air that can be supplied to the container. The control valve comprises an adjustment screw and a loose insertion of silk or cotton, and with the aid of these means the outflow of oil may be controlled in the same manner as in U.S. Pat. No. 1,092,164. In the upper portion of the container there is an opening for filling the container when it is empty.

U.S. Pat. No. 3,507,359 shows a lubricating system for circulating lubricant through the bearings of a machine. The system comprises, except the bearings to be lubricated, an oil sump, a pump, a manifold and a security switch provided to sense the flow of oil and to disconnect the current to the machine when the oil flow decreases below a certain level. The construction of the manifold is not further disclosed.

EP-A-141 573 shows the construction of a reservoir for oil feeded to a bearing, for instance, by means of gravity.

U.S. Pat. No. 1,855,516 discloses a lubricator having a complicated construction and comprising an oil supply container provided with a plurality of oil conduits extending upwardly in the interior of the container and having an inlet for oil normally positioned above the oil level in the container. An oil carrier is slidable along each oil conduit for carrying oil upwardly to the conduit inlet. Means is provided to reciprocate the carrier upwardly and downwardly. By means of an adjustment screw, the height of the upward movement of the oil carrier may be determined, and thus the quantity of oil delivered through the oil conduits may be regulated.

U.S. Pat. No. 3,217,835 discloses a lubricator having a distribution device for distributing a certain amount of oil to different points of lubrication. The distribution device comprises a rotary valve disc rotating with a constant speed and having passages, which will be connected with opposite outlet channels, when they pass said channels during the rotation of the valve disc.

SUMMARY OF THE INVENTION

The object of the present invention is to remedy the problems mentioned above. In particular the present invention aims at an improved and more reliable distribution of lubricant to different points of lubrication.

This object is obtained by means of the distribution device initially defined, which is characterized in that a distributor is provided in the inner room of the casing and forming together with the casing a downwardly tapering channel, that the inlet means has an orifice in the inner room positioned such that lubricant entering the inner room from the orifice flows farther in the tapering channel while being spread in different directions, and that the distributor is provided with gap forming means for distributing lubricant from the tapering channel to the respective outlet means, such that the lubricant is equally distributed to the respective outlet means independently of the amount of lubricant entering the inner room during operation thereof. Furthermore, the object of the invention is obtained by the pump apparatus initially defined, which is characterized in that that the lubrication device comprises a distribution device having an inlet means for the delivery of lubricant to the distribution device, at least two outlet means for the removal of lubricant from the distribution device, said outlet means being connected to the said points of lubrication, and that a distributor is provided in the inner room of a casing of the distribution device and forming together with the casing a downwardly tapering channel, that the inlet means comprises an orifice in the inner room positioned such that lubricant entering the inner room from the orifice flows farther in the tapering channel while being spread in different directions, and that the distributor is provided with gap forming means for distributing lubricant from the tapering channel to the respective outlet means, such that the lubricant is equally distributed to the respective outlet means independently of the amount of lubricant entering the inner room during operation thereof.

Thus, by means of the present invention the lubricant is equally distributed to all the bearings of the pump, thereby ensuring lubrication of each bearing and increasing the reliability. By forming the distribution device as a casing, it can easily be closed against the environment, preventing particles of dirt from finding their way through the casing and causing damage.

According to a preferred embodiment the lubricant delivered to the distribution device is ejected against a peripheral surface tapering upwards. Thereby, an effective guidance of the flow of lubricant into different directions on the peripheral surface is obtained. In a preferred embodiment, the peripheral surface has a central axis being parallel to a longitudinal axis of the distribution device in order to obtain an optimal distribution result.

In a further development of this embodiment, the peripheral surface is symmetrical in particular with respect to the distance from the orifice of the inlet means to two end edges of the peripheral surface. Thereby, it is ensured that the same amount of lubricant is flowing in both directions.

Furthermore, the sloping surfaces may be provided below a respective end edge, whereby a further separation of the flow of lubricant is obtained.

According to a further embodiment a cylindrical surface provided below the peripheral surface is abutting a cylindrical wall of a cavity provided in the casing, thereby forcing the lubricant to flow along the peripheral surface to its end edges in two directions in two identical flow channels. Each of the two channels formed will have side walls converging downwards and joining each other at the bottom of the channel. Such channels support an equal distribution to both channels.

Preferaby, the peripheral surface and the cylindrical surface are formed by a segment forming a part of the distributor being insertable in the cavity in a convenient manner.

According to another preferred embodiment two conical recesses are provided at the inner bottom surface of the distribution device, said recesses resulting in a further separation of the flow of lubricant. The relatively big area of these recesses permits the provision of a distance between the sloping surfaces and the recesses, such that the two oil flows may easily be observed through a transparent casing. Thereby, it is possible to exactly adjust the flow of lubricant to a desired rate by an adjustment screw.

Since lubricant is sucked through the distribution device by means of a subpressure produced by the pump, the flow of lubricant may in an easy and effective manner be controlled by decreasing the subpressure in the distribution device by means of a passage to the environment, which passage may be throttled by the adjustment screw. In order to prevent dirt from penetrating the distribution device a filter may be provided outside this passage.

BRIEF DESCRIPTION OF THE DRAWINGS

The present invention will now be explained in more detail with reference to different embodiments, by way of example only, and with reference to the figures.

FIG. 3 shows a side view of a joint device.

FIG. 4 shows a partly sectional front view of the joint device in FIG. 3.

FIG. 5 shows a front view of a part of the joint device in FIG. 3.

FIG. 6 shows a front view of another part of the joint device in FIG. 3.

DETAILED DESCRIPTION OF VARIOUS EMBODIMENTS OF THE INVENTION

Figure 1:
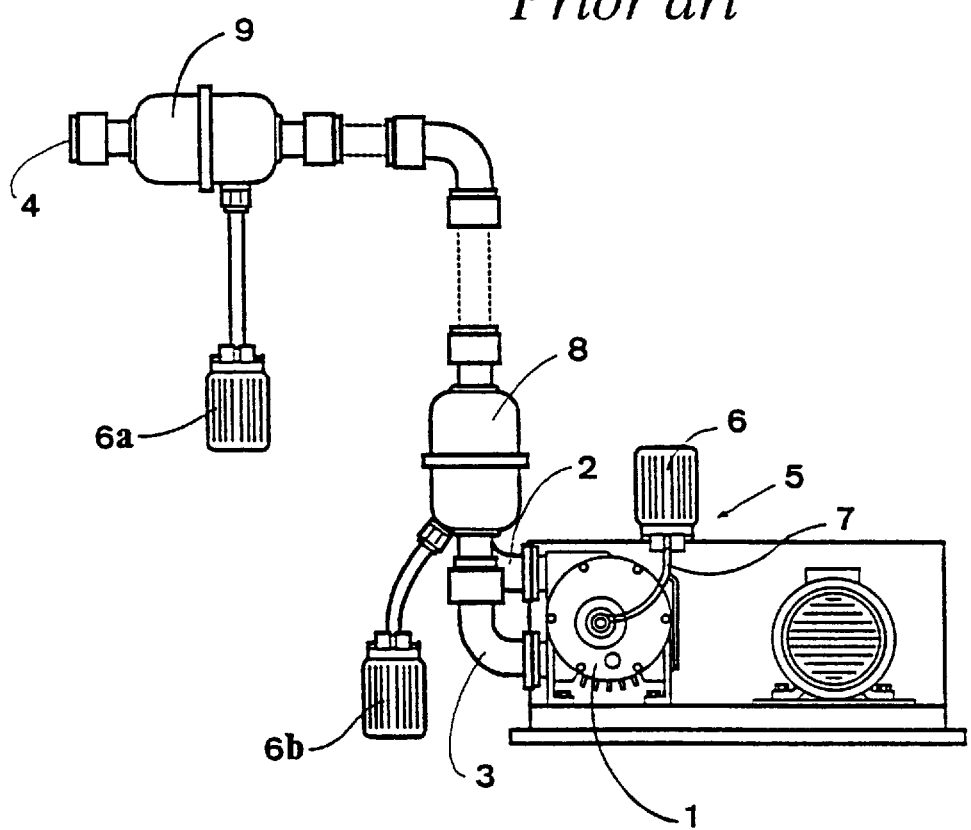
FIG. 1 shows a pump apparatus according to the state of the art.

FIG. 1 shows a pump apparatus comprising a pump 10 having a pressure side 11 and a suction side 12. On the pressure side 11 of the pump there is a combined silencer and oil separator 13, in the following called the oil separator 13, from which an outlet conduit 14 is leading the sucked air out through a wall. The pump 10, which in this case is driven by an electric motor, is provided with two shaft bearings. In order to ensure the function of the pump 10, these bearings must continuously be supplied with lubricant. To this end the pump apparatus comprises an oil container 15, which may be a usual plastic can being available on the market. A joint device 16 is inserted in the oil container 15. From the joint device 16 an oil conduit 17 is leading to a distribution device 18. In the distribution device 18, the incoming oil is separated, in this case, into two outlet conduits 19, conveying the oil to two bearings of the pump 10.

The air, mixed with oil and forced out from the pump 10 on its pressure side 11, is fed to the oil separator 13. Therein, the air is conveyed in an upward and downward movement such that it may expand in an expansion chamber 20. Oil, deposited on the walls in the expansion chamber 20 and collected by filtering means 21 provided in the expansion chamber, is transported via a discharge conduit 22 from the lowest part of the oil separator 13 back to the oil container 15. Because an overpressure prevails in the oil separator 13, air and oil will be forced through the conduit 22 back to the container 15. The system is open, i.e. the pressure may be equalized with the atmospheric pressure at the opening of the container 15.

The bearings of the pump 10 communicate with the suction side 12 of the pump 10, such that the pump 10 will produce a subpressure in the oil conduits 19, whereby oil will be sucked from the container 15 via the conduit 17 to the distribution device 18 and therefrom to the bearings of the pump via the conduits 19.

The joint device 16 will now be described in more detail with reference to FIGS. 3–6. The joint device 16 comprises an essentially cylindrical casing 23 comprising two parts 23a and 23b, for reasons of manufacture. The part 23a comprises a middle portion having a semi-cylindrical shape. An intermediate partition 24 extends between parallel outer edges of the semi-cylindrical middle portion. The part 23b has a semi-cylindrical shape as well and comprises an inner partition 25 dividing the room, partly enclosed by the semi-cylindrical part 23b, into two sub-rooms of essentially equal size. Of course, it is also possible to produce the casing 23 in one single part. The two parts 23a, 23b of the casing are, in the example disclosed, connected to each other by hook-shaped means 26. Other types of connecting means may also be used. The oil conduit 17 extends through an opening 27 in the upper portion of the joint device 16, said conduit being connected to an inlet channel 28 disposed in the lower portion of the joint device 16. At the outer bottom surface of the joint device 16, there is provided the orifice of the inlet channel 28. Furthermore, the joint device 16 is provided with a cylindrical envelope surface 29 extending around the inlet channel 28 and comprising flanges 30 or similar projections for the attachment of an oil filter 31, such that the oil filter covers the orifice of the inlet channel 28. An inlet means 32 is provided in the upper portion of the joint device 16 and comprises a pipe socket 33 having the conduit 22 attached thereon. The inlet means 32 extends to a separating means 24, 34 for separation of oil from the mixture of air and oil, which is supplied via the conduit 22. In the example disclosed, the orifice of the inlet means 32 is disposed in an expansion chamber 34 formed by the casing 23, and more precisely by the intermediate partition 24 of the part 23a and one of the sub-rooms of the part 23b. The expansion chamber 34 extends downwards to a sloping wall 35, which may slope 10–70 degrees, preferably 20–50 degrees, for example about 30 degrees with respect to a horizontal plane. In the lowest part of the sloping wall 35 is disposed an opening 36 leading to the container 15. The expansion chamber 34 extends from the sloping wall 35 back upwards on the other side of the intermediate partition 24, i.e. seen in FIG. 5 the expansion chamber 34 extends upwards behind the intermediate partition 24. An opening 37, indicated by a dotted line in FIG. 5, is provided on the other side of the intermediate partition 24 in the vertical outer wall of the part 23a.

The mixture of air and oil conveyed through the inlet means 32 via the supply conduit 22 expands in the expansion chamber 34, such that oil is deposited on the vertical walls and the sloping wall 35 of the expansion chamber 34. During the passage through the expansion chamber 34 the mixture of air and oil is subjected to a change of direction, i.e. is guided from a downward movement to an upward movement, whereby the oil being present in the air tends to continue in the first downward direction towards the sloping wall 35, due to forces of inertia and gravitation. Thereafter, the air may be removed through the opening 37 and the oil deposited is flowing downwards on the walls and through the opening 36, and back to the oil in the oil container 15.

Figure 2:
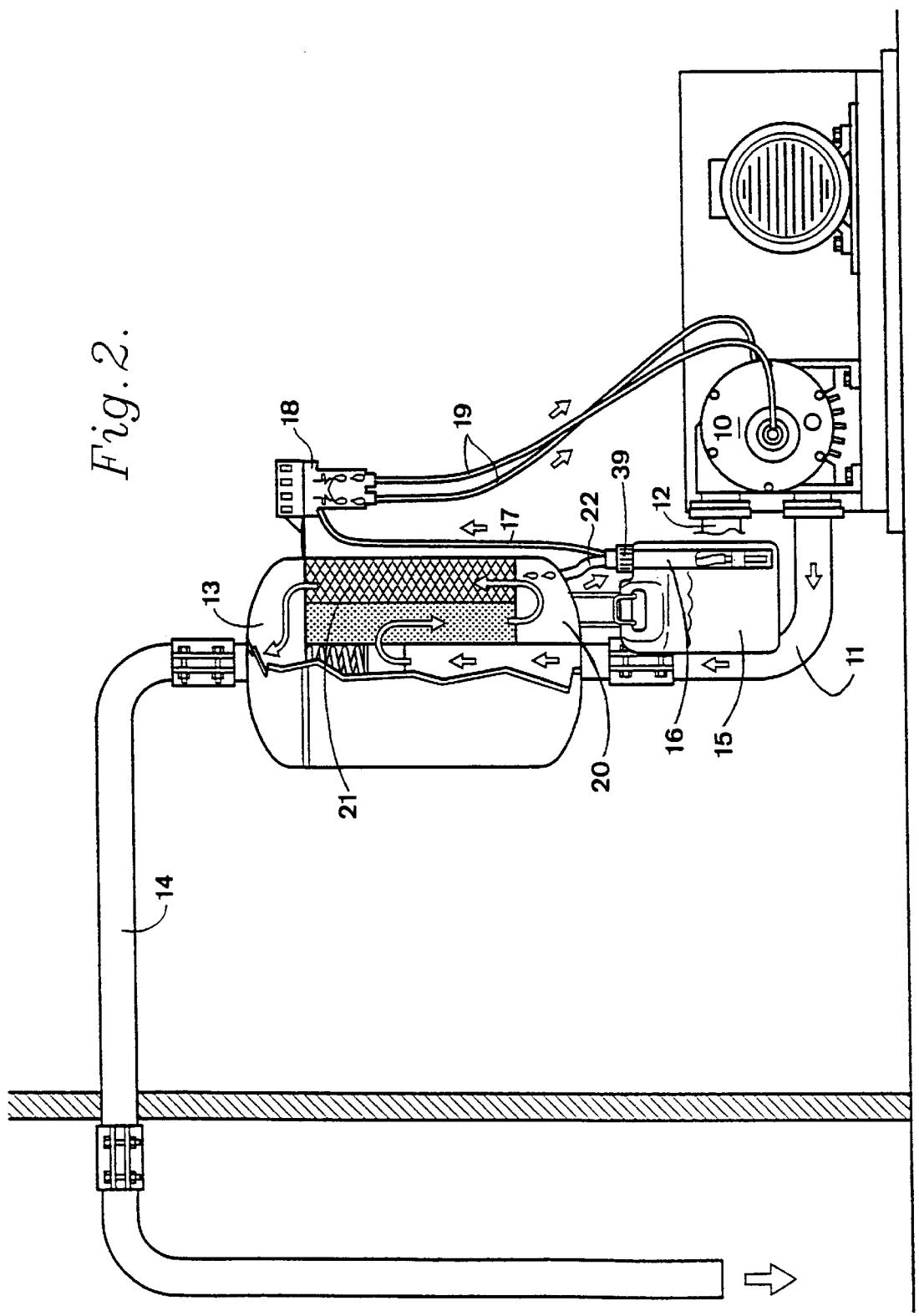
FIG. 2 shows a pump apparatus according to the invention.
Figure 7:
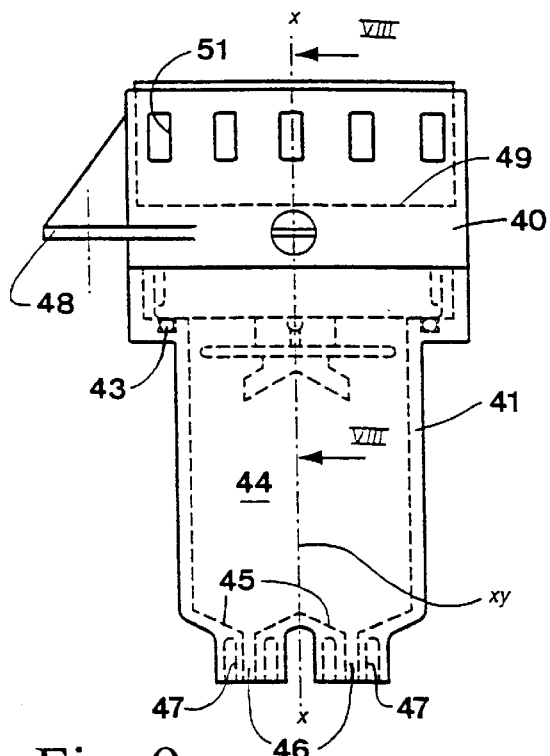
FIG. 7 shows a side view of a distribution device.
Figure 8:
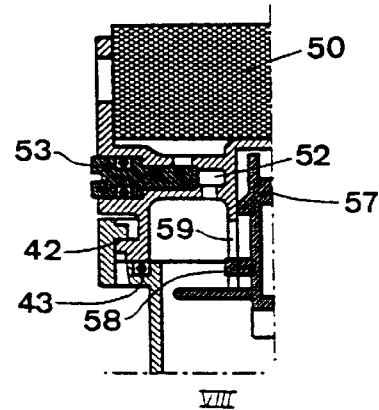
FIG. 8 shows a section of the distribution device along the line VIII—VIII in FIG. 7.
Figure 9:
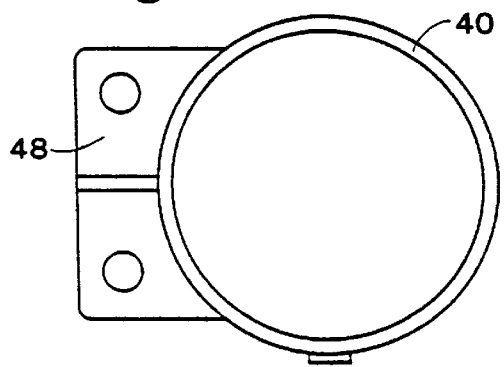
FIG. 9 shows a view from above of the distribution device in FIG. 7.
Figure 10:
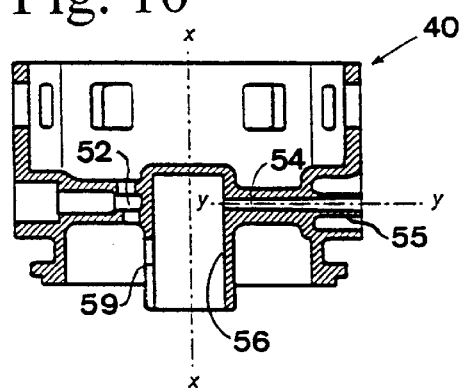
FIG. 10 shows another section of the upper portion of the distribution device.
Figure 11:
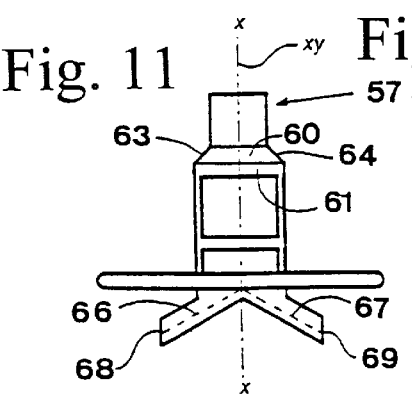
FIG. 11 shows a side view of a distributor in the distribution device.

A flange 38 or the like is provided on the outside of the casing 23 at the upper portion of the joint device 16. The flange has such a shape and dimension that it may rest against the edge of the opening of the container 15 when the joint device 16 is inserted in the container 15. The opening of the container 15 is provided in a socket having an external thread. By means of an attachment nut 39, see FIG. 2, which may be threaded on the threaded socket, the joint device 16 may be fixed in the container 15.

The distribution device 18 will now be described in more detail with reference to FIGS. 7–12. The distribution device 18 comprises an upper cylindrical portion 40 and a lower cylindrical portion 41. They are connected to each other preferably by means of a bayonet connection 42, which connects the two portions 40 and 41, and by means of a seal ring 43, seals the inner room 44 formed by the portions 41 and 42 against the atmosphere. The distribution device 18 comprises a longitudinal axis X—X being essentially vertical when the distribution device is in its normal operating position. The lower portion 41 is at least partly produced in a transparent material. At the inner bottom surface of the lower portion 41 there are provided two circular conical recesses 45. They are terminated in their lowest part in a respective outlet channel 46 comprising a pipe socket 47 having an orifice on the lower side of the lower portion 41. Each pipe socket 47 is connected to an oil conduit 19. The upper portion 40 is on its outer side provided with an attachment means 48 by which the distribution device 18 may be fixed in its normal operation position, and on its upper side provided with a recess 49 in which an air filter 50 is disposed. The air may be introduced from above or through openings 51 in the envelope surface of the upper portion. The upper portion 40 comprises a passage 52 through which atmospheric air may be sucked from the recess 49 into the inner room 44. The section area of the passage 52 may be adjusted by means of an adjustment screw 53 provided in the upper portion 40. When the screw 53 is screwed outwardly the passage 52 is opened and when it is screwed inwardly the passage 52 is throttled. Furthermore, the upper portion 40 comprises an inlet channel 54 which by means of a pipe socket 55 is connected to the oil conduit 17 from the joint device 16 and the oil container 15. The inlet channel 54 has an orifice in a circular cylindrical cavity 56 which is provided on the underside of the upper portion 40 and extends coaxially with the longitudinal axis X—X. A distributor 57 is provided in this cavity 56.

Figure 12:
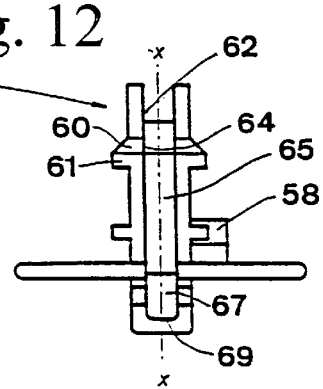
FIG. 12 shows another side view of the distributor according to FIG. 11.

The distributor 57 may only be mounted in the cavity 56 with a predetermined orientation due to a pin 58 provided on a lower part of the distributor and a slot 59 provided in the cavity 56 to cooperate with the pin 58. When the distributor 57 is mounted in the cavity 56, the orifice of the inlet channel 54 is located opposite a peripheral surface 60 of the distributor 57, which is upwardly tapering and extends almost 180 degrees. This surface is in the example disclosed conical but may also be convex or concave, seen in a plane being parallel to the longitudinal axis X—X. The conical surface 60 has a central axis being coaxial with the longitudinal axis X—X and is symmetrically shaped with respect to a plane XY extending through a central axis Y—Y of the inlet channel 54 and the longitudinal axis X—X. The conical surface 60 is formed by a circular conical segment of the distributor 57. The circular conical segment changes in a downward direction to a circular cylindrical segment comprising a cylindrical envelope surface 61 abutting the wall of the circular cylindrical cavity 56. A circular conical segment and the circular cylindrical segment form parts of a plan surface 62 extending downwardly and parallel to the axis of the cavity 56. The end edges 63, 64 of the conical surface 60 define the beginning of the plan surface 62, such that an open gap 65 is formed and delimited by the plan surface 62 and another limitation which in the example disclosed, see FIG. 12, is formed by a segment similarly formed with an envelope surface abutting the diametrically opposite wall of the cavity 56. The gap 65 extends downwardly to two sloping surfaces 66 and 67, diverging downwardly away from each other. The end edges 68, 69 of the surfaces 66, 67 are disposed straight above a respective outlet channel 46 when the distribution device 16 is vertically disposed.

Thus, the oil is sucked by the subpressure from the pump 10 through the inlet channel 54 and against the conical surface 60. Since the cylindrical envelope surface 61 abuts the wall of the cavity 56 the oil may only be further transported by flowing into different directions in the flow channel formed by the conical surface 60 and the wall of the cavity 56. Hence, the flow channel will have a downwardly tapering shape, i.e. the sides of the channel are converging downwardly and are joined together at the bottom of the channel. It has now been found that due to this particular shape exactly the same amount of oil will flow in each direction independent of a slight inclination of the distribution device. When the oil arrives at the end edges 63, 64 of the conical surface 60 it will flow downwards along the plan surface 62 in two separate paths. The oil from one of the end edges 63 will hit the sloping surface 66 and the oil from the other end edge 64 will hit the other sloping surface 67. Due to the inclination of these surfaces 66, 67, the oil may only flow outwards and downwards and an increased separation effect of the oil paths is obtained. The sloping surfaces 66, 67 end straight above a respective outlet channel 46. Due to the conical recesses 45 the oil from one of the sloping surfaces 66 will therefore be transported through one of the outlet channels 46 and the oil from the upper sloping surface 67 through the other outlet channel 46, although the distribution device would incline slightly. Since the end edges 68 and 69 are disposed at a relatively long distance from the conical recess 45, the dripping frequency to the two bearings may be easily observed and adjusted by means of the adjustment screw 53.

Although the peripheral upwardly tapering conical surface 60, the cylindrical envelope surface 61, and the cavity 56 are all circular in the example disclosed, they may also have another shape. For example, they may be oval. The plan surface 62 may also comprise a non plan shape, for example a convex shape.

We claim:

1. A distribution device for distributing lubricant to different points of lubrication of a pump device, said distribution device comprising:
    a casing forming an inner room;
    an inlet means for the delivery of lubricant to the inner room of the casing;
    at least two outlet means for the removal of lubricant from the inner room of the casing, said outlet means being connectable to said points of lubrication; and
    a distributor provided in the inner room of the casing and including a peripheral surface, the distributor forming together with the casing a downwardly tapering channel,
    the inlet means having an orifice in the inner room positioned such that lubricant entering the inner room from the orifice flows into the tapering channel while being spread in different directions,
    the distributor having gap forming moves for distributing lubricant from the tapering channel to the respective outlet means, such that lubricant is equally distributed to the respective outlet means independently of the amount of lubricant entering the inner room during operation of the distributor,
    wherein the distributor is provided in a cavity in the casing, which comprises a wall in which the orifice of the inlet is disposed, and wherein the peripheral surface changes to a cylindrical surface abutting a cylindrical portion of the wall of the cavity, thereby forming two identical flow channels extending in two directions from the orifice.

2. A distribution device according to claim 1, wherein the peripheral surface has a central access and wherein the distribution device has a longitudinal axis which is essentially vertical when the distribution device is in its normal operation position, said central axis and said longitudinal axis being essentially parallel.

3. A distribution device according to claim 2, wherein the orifice of the inlet means has a center and the peripheral surface extends from the orifice in two directions and is symmetrical with respect to a plane extending through said center and the longitudinal axis.

4. A distribution device according to claim 3, wherein the peripheral surface extends laterally to two end edges symmetrically provided with respect to said plane.

5. A distribution device according to claim 4, wherein each end edge is disposed straight above a respective sloping surface when the distribution device is in its vertical position, each said sloping surface sloping downwards from said plane in a different direction with respect to the other sloping surface.

6. A distribution device according to claim 5, wherein the peripheral surface and the cylindrical surface are formed by an upwardly tapering segment and a segment of the cylinder, respectively, of the distributor, and wherein the tapering segment and the segment of the cylinder form portions of a backward surface extending parallel to the longitudinal axis along the distributor, and wherein the backward surface changes to the said sloping surfaces said sloping surfaces being positioned below said backward surface.

7. A distribution device according to claim 1, wherein the peripheral surface and the cylindrical surface are formed by an upwardly tapering segment and a segment of a cylinder, respectively, of the distributor, and wherein the upwardly tapering segment and the segment of the cylinder form portions of a backward surface extending parallel to the longitudinal axis along the distributor.

8. A distribution device according to claim 1, wherein the upwardly tapering surface is conical.

9. A distribution device according to claim 1, wherein the casing comprises an upper portion and a lower portion, said cavity and distributor being provided in the upper portion.

10. A distribution device according to claim 9, wherein each outlet means includes an orifice and wherein the lower portion comprises a bottom having two conical recesses on its inner side and in the lowest part of each recess is disposed the orifice of the respective outlet means.

11. A distribution device according to claim 10, wherein the peripheral surface extends laterally to two end edges and wherein each end edge is disposed straight above a respective sloping surface when the distribution device is in its vertical position, each said sloping surface sloping downwards from said plane in a different direction with respect to the other sloping surface, and wherein each outlet means is disposed straight below a respective one of said lower end edges of the sloping surfaces.

12. A distribution device according to claim 11, wherein the lower portion of the casing comprises a transparent part, thereby enabling the observation of the dropping frequency of the lubricant from the sloping surfaces to the conical recesses at the bottom.

13. A distribution device according to claim 1, including a passage between the inner room and the environment and adjustment means provided in the casing for enabling adjustment of the cross-sectional area of the passage between the inner room and the environment, thereby increasing the supply of lubricant when the passage is throttled.

14. A distribution device according to claim 1, wherein the casing presents a wall defining a cavity in the casing, the orifice of the inlet means being disposed in said wall, said distributor being located in said cavity.

15. A pump apparatus comprising:

a pump having a suction side and a pressure side; and a lubrication device for supplying lubricant to different points of lubrication of the pump apparatus, wherein the lubrication device comprises a distribution device having an inlet means for the delivery of lubricant to the distribution device, at least two outlet means for the removal of lubricant from the distribution device, and a casing having an inner room, said outlet means being connected to said points of lubrication, and a distributor provided in the inner room of the casing of the distribution device and forming together with the casing a downwardly tapering channel, wherein the inlet means comprises an orifice in the inner room positioned such that lubricant entering the inner room from the orifice flows in the tapering channel while being spread in different directions, and wherein the distributor is provided with gap forming means for distributing lubricant from the tapering channel to the respective outlet means, such that the lubricant is equally distributed to the respective outlet means independently of the amount of the lubricant entering the inner room during operation of the distributor, wherein the points of lubrication of the pump communicate with the suction side of the pump, thereby enabling a subpressure produced by the pump to suck lubricant to the points of lubrications via the distribution device.

16. A pump apparatus according to claim 15, the lubrication device including a separate container of lubricant, one supply conduit from the container to the inlet means of the distribution device, and at least two conduits between the outlet means of the distribution device and the points of lubrication of the pump.

17. A pump apparatus according to claim 15, including a passage between the interior of the distribution device and the environment and an adjustment means provided in the distribution device to enable adjustment of the cross-sectional area of the passage between the interior of the distribution device and the environment in order to increase or decrease the suction effect of the pump.

18. A pump apparatus according to claim 17, including an air filter provided outside the passage.

19. A pump apparatus according to claim 18, wherein the distribution device comprises a transparent part in the proximity of the outlet means.

* * * * *